United States Patent
Finch, Jr. et al.

(10) Patent No.: US 9,616,875 B2
(45) Date of Patent: Apr. 11, 2017

(54) PISTON STROKE SENSOR ARRANGEMENT FOR A BRAKE UNIT

(71) Applicant: Westinghouse Air Brake Technologies Corporation, Wilmerding, PA (US)

(72) Inventors: Glyn A. Finch, Jr., Simpsonville, SC (US); Maria Koon, Greenville, SC (US); Peter D. Mathern, Greenville, SC (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 14/483,329

(22) Filed: Sep. 11, 2014

(65) Prior Publication Data

US 2016/0075320 A1   Mar. 17, 2016

(51) Int. Cl.
*B60T 17/22* (2006.01)
*F16D 65/28* (2006.01)
*F16D 66/00* (2006.01)
*B60T 13/66* (2006.01)

(52) U.S. Cl.
CPC .......... *B60T 17/228* (2013.01); *B60T 13/665* (2013.01); *F16D 65/28* (2013.01); *F16D 66/00* (2013.01); *F16D 2066/003* (2013.01)

(58) Field of Classification Search
CPC ...... F16D 66/02; F16D 66/021; F16D 66/022; F16D 66/023; F16D 66/025; F16D 66/028; F16D 59/02; F16D 2121/10; B60T 17/228; B60T 13/22
USPC ............... 188/1.11 W, 1.11 L, 1.11 E, 1.11 R
See application file for complete search history.

(56) References Cited

U.S. PATENT DOCUMENTS

| 3,415,115 | A | | 12/1968 | Newell |
| 3,443,842 | A | | 5/1969 | Pier |
| 3,557,665 | A | * | 1/1971 | Von Lowis ............ B60T 17/14 |
| | | | | 188/170 |
| 3,691,982 | A | | 9/1972 | Hawthorne |
| 3,768,598 | A | | 10/1973 | Pollinger et al. |
| 4,401,986 | A | * | 8/1983 | Trenkler et al. ......... 324/207.15 |
| 4,532,462 | A | | 7/1985 | Washbourn et al. |
| 4,546,298 | A | | 10/1985 | Wickham et al. |
| 4,757,300 | A | | 7/1988 | Sebalos |
| 4,790,606 | A | | 12/1988 | Reinecke |
| 4,799,740 | A | | 1/1989 | Iwaizako et al. |

(Continued)

FOREIGN PATENT DOCUMENTS

| AU | 198544624 | 9/1986 |
| DE | 3543456 A1 | 6/1987 |

(Continued)

*Primary Examiner* — Thomas J Williams
(74) *Attorney, Agent, or Firm* — The Webb Law Firm

(57) ABSTRACT

A piston stroke sensor arrangement for a brake unit includes a brake unit including a piston and a piston tube, and a proximity sensor supported on the brake unit. The proximity sensor may determine the location of the piston within the brake unit based on the position of the piston tube relative to the proximity sensor. The proximity sensor may be an inductive proximity sensor. A groove may be defined in an outer circumferential surface of the piston tube. When the brake unit is in a non-applied position, the proximity sensor may detect metal of the piston tube. When the brake unit is in an applied position, the proximity sensor may not detect the metal of the piston tube.

15 Claims, 6 Drawing Sheets

(56) References Cited

U.S. PATENT DOCUMENTS

| | | |
|---|---|---|
| 4,800,991 A | 1/1989 | Miller |
| 4,805,740 A | 2/1989 | Wilke et al. |
| 4,904,027 A | 2/1990 | Skantar et al. |
| 4,953,668 A | 9/1990 | Severinsson |
| 4,953,669 A | 9/1990 | Severinsson |
| 5,003,829 A | 4/1991 | DeConti et al. |
| 5,035,303 A | 7/1991 | Sullivan |
| 5,087,907 A | 2/1992 | Weiler et al. |
| 5,103,940 A | 4/1992 | Meneut et al. |
| 5,206,625 A | 4/1993 | Davis |
| 5,226,509 A | 7/1993 | Smith |
| 5,244,061 A | 9/1993 | Hoyt et al. |
| 5,255,760 A | 10/1993 | Lamb et al. |
| 5,310,023 A | 5/1994 | Martinez |
| 5,337,878 A | 8/1994 | Mehlert et al. |
| 5,358,075 A * | 10/1994 | Jarzombek ............... 188/1.11 L |
| 5,410,911 A | 5/1995 | Severinsson |
| 5,419,620 A | 5/1995 | Keschwari-Rasti |
| 5,433,296 A | 7/1995 | Webberley |
| 5,441,128 A | 8/1995 | Hoyt |
| 5,450,930 A | 9/1995 | Martens et al. |
| 5,471,736 A * | 12/1995 | Griebeler ................ 324/207.15 |
| 5,501,305 A | 3/1996 | Stalmeir et al. |
| 5,632,359 A | 5/1997 | Camps et al. |
| 5,689,231 A | 11/1997 | Olson |
| 5,707,045 A | 1/1998 | Easter |
| 5,753,807 A | 5/1998 | Trueman et al. |
| 5,803,211 A | 9/1998 | Wilke |
| 5,816,371 A | 10/1998 | Buckley et al. |
| 5,816,778 A | 10/1998 | Elsey, Jr. et al. |
| 5,825,287 A | 10/1998 | Zarybnicky, Sr. et al. |
| 6,006,868 A | 12/1999 | Klink |
| 6,135,242 A | 10/2000 | Hockley |
| 6,145,633 A | 11/2000 | Niederstadt et al. |
| 6,215,394 B1 | 4/2001 | Sellin |
| 6,250,435 B1 | 6/2001 | Dellmann et al. |
| 6,352,137 B1 | 3/2002 | Stegall et al. |
| 6,411,206 B1 * | 6/2002 | Weant et al. ............ 188/1.11 E |
| 6,501,375 B1 | 12/2002 | Weant et al. |
| 6,581,728 B2 | 6/2003 | Borugian |
| 6,662,641 B2 | 12/2003 | Scorteanu et al. |
| 6,722,477 B1 | 4/2004 | Wolfsteiner et al. |
| 6,753,771 B2 | 6/2004 | Lesesky |
| 6,776,266 B2 | 8/2004 | Fuglewicz et al. |
| 6,776,268 B2 | 8/2004 | Hart |
| 6,851,761 B2 | 2/2005 | Baumgartner et al. |
| 6,871,916 B2 | 3/2005 | Stephane et al. |
| 6,913,325 B2 | 7/2005 | Michel et al. |
| 6,957,571 B2 | 10/2005 | Staltmeir et al. |
| 7,014,019 B2 | 3/2006 | Krug et al. |
| 7,055,660 B2 | 6/2006 | Friesen |
| 7,114,596 B2 | 10/2006 | Borugian |
| 7,114,597 B2 | 10/2006 | Siebke |
| 7,175,006 B2 | 2/2007 | Plantan et al. |
| 7,234,567 B2 | 6/2007 | Wagner et al. |
| 7,398,141 B2 | 7/2008 | Steph et al. |
| 7,413,061 B2 | 8/2008 | Wagner et al. |
| 8,616,342 B2 | 12/2013 | Wallace et al. |
| 2003/0010132 A1 | 1/2003 | Scorteanu et al. |
| 2004/0069055 A1 | 4/2004 | Staltmeir et al. |
| 2005/0039988 A1 | 2/2005 | Philpott |
| 2005/0258006 A1 | 11/2005 | Plantan et al. |
| 2006/0151261 A1 | 7/2006 | Wagner et al. |
| 2006/0180413 A1 | 8/2006 | Halasy-Wimmer et al. |
| 2010/0025165 A1 | 2/2010 | Utzt et al. |
| 2010/0219028 A1 * | 9/2010 | Emilsson ................ 188/153 R |
| 2011/0139555 A1 | 6/2011 | Hori |
| 2011/0174581 A1 | 7/2011 | Vollert et al. |
| 2011/0308897 A1 * | 12/2011 | Wallace et al. .......... 188/1.11 R |
| 2012/0091787 A1 | 4/2012 | Nishino et al. |
| 2012/0211312 A1 | 8/2012 | Engels |
| 2013/0112515 A1 | 5/2013 | Shinagawa |

FOREIGN PATENT DOCUMENTS

| | | |
|---|---|---|
| DE | 4418791 C1 | 8/1995 |
| DE | 4425598 C1 | 12/1995 |
| DE | 19509031 A1 | 9/1996 |
| DE | 102008006487 A1 | 7/2009 |
| EP | 0531643 A2 | 3/1993 |
| EP | 0674118 A1 | 9/1995 |
| EP | 0794102 A1 | 9/1997 |
| FR | 1225506 | 7/1960 |
| FR | 2970454 A1 | 7/2012 |
| GB | 1408479 | 10/1975 |
| GB | 2269905 A | 2/1994 |
| JP | 92244 A | 1/1997 |
| JP | 10267055 A | 10/1998 |
| JP | 2000052952 A | 2/2000 |
| WO | 2009118350 A2 | 10/2009 |

* cited by examiner

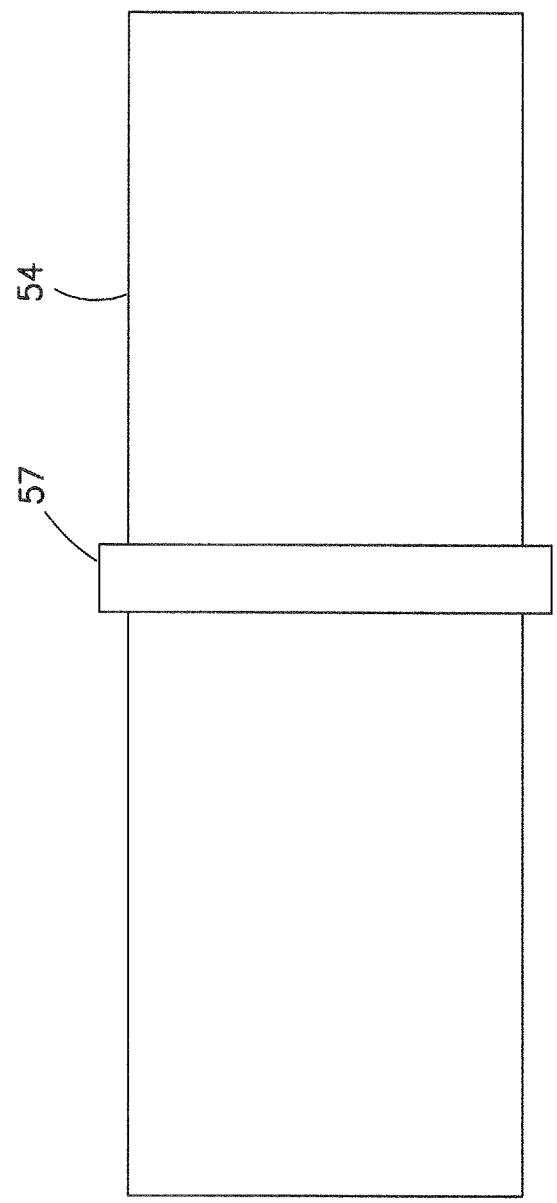

PISTON STROKE SENSOR ARRANGEMENT FOR A BRAKE UNIT

BACKGROUND OF THE INVENTION

Field of the Invention

This disclosure relates generally to piston stroke sensor arrangements and, more particularly, to a piston stroke sensor arrangement for a brake unit of a railway vehicle.

Description of Related Art

Federal regulations for the inspection of brake units on railway vehicles now mandate that each commuter and short-distance intercity passenger train shall receive a Class I brake test at least once during each calendar day that the train is placed or continues in service. Operators must apply pressurized fluid to the braking system and ensure that the brake pads on the calipers of the disc brake units properly contact the disc surface of the discs of the railway vehicle. Train operators must walk the length of the train and visually verify pad-to-disc contact. During these inspections, it is often difficult for the operator to see and properly identify brake application, especially on cars in which the disc brake units are located in-board of the railway vehicle. When the brake units are positioned in-board of the railway vehicle, it is often necessary for the operator to inspect the brake units using a pit or maintenance facility to gain access to the in-board portion of the railway vehicle.

In view of the foregoing, a need exists for an arrangement that provides an indication of the operation of the brake units to the train operator using electronic signals. A need exists for an arrangement that identifies whether the brake unit is in an applied or released position. A further need exists to provide an alternate means for performing visual pre-trip brake function inspections.

SUMMARY OF THE INVENTION

In one embodiment, a piston stroke sensor arrangement for a brake unit includes a brake unit including a piston and a piston tube, and a proximity sensor supported on the brake unit. The proximity sensor may determine the location of the piston within the brake unit based on the position of the piston tube relative to the proximity sensor.

The proximity sensor may be an inductive proximity sensor. A groove may be defined in an outer circumferential surface of the piston tube. When the brake unit is in a non-applied position, the proximity sensor may detect metal of the piston tube. When the brake unit is in an applied position, the proximity sensor may not detect the metal of the piston tube. When the brake unit is in an applied position, the proximity sensor may be directed towards the groove on the piston tube. When the brake unit is in a non-applied position, the proximity sensor may be directed towards a portion of the piston tube that does not include the groove. A protrusion may be provided on an outer circumferential surface of the piston tube. When the brake unit is applied, the proximity sensor may be directed towards the protrusion on the piston tube. When the brake unit is not applied, the proximity sensor may not be directed towards the protrusion on the piston tube. An air pressure indicator may be positioned in fluid communication between a fluid source and the brake unit. A notification device may be connected to the proximity sensor and the air pressure indicator. The air pressure indicator may be configured to send information to the notification device identifying the amount of air pressure being supplied to the brake unit. Information from the proximity sensor may be directed to the notification device to identify a position of the piston in the brake unit. The brake unit may be a disc brake unit. The proximity sensor may be configured to detect when the piston of the brake unit is positioned in an over-stroke position. The brake unit may include an anchor flange that supports the piston and piston tube. The proximity sensor may be positioned in the anchor flange adjacent the piston tube.

In another embodiment, a railway vehicle with a piston stroke sensor arrangement includes a railway vehicle including a brake unit, the brake unit including a piston and a piston tube, and a proximity sensor positioned on the brake unit. The proximity sensor may determine the location of the piston within the brake unit based on the position of the piston tube relative to the proximity sensor.

The proximity sensor may be an inductive proximity sensor. A groove may be defined in an outer circumferential surface of the piston tube. When the brake unit is in a non-applied position, the proximity sensor may detect metal of the piston tube. When the brake unit is in an applied position, the proximity sensor may not detect the metal of the piston tube. When the brake unit is in an applied position, the proximity sensor may be directed towards the groove on the piston tube. When the brake unit is in a non-applied position, the proximity sensor may be directed towards a portion of the piston tube that does not include the groove. A protrusion may be provided on an outer circumferential surface of the piston tube. When the brake unit is applied, the proximity sensor may be directed towards the protrusion on the piston tube. When the brake unit is not applied, the proximity sensor may not be directed towards the protrusion on the piston tube. An air pressure indicator may be positioned in fluid communication between a fluid source and the brake unit. A notification device may be connected to the proximity sensor and the air pressure indicator. The air pressure indicator may be configured to send information to the notification device identifying the amount of air pressure being supplied to the brake unit. Information from the proximity sensor may be directed to the notification device to identify a position of the piston in the brake unit. The brake unit may be a disc brake unit. The proximity sensor may be configured to detect when the piston of the brake unit is positioned in an over-stroke position. The brake unit may include an anchor flange that supports the piston and piston tube. The proximity sensor may be positioned in the anchor flange adjacent the piston tube.

In a further embodiment, a method of determining a piston stroke position for a brake unit includes the steps of: providing a brake unit including a piston and a piston tube, and a proximity sensor positioned on the brake unit; emitting a detection signal from the proximity sensor to the piston tube; and determining the position of the piston within the brake unit based on the position of the piston tube relative to the detection signal emitted from the proximity sensor. A groove may be defined in an outer circumferential surface of the piston tube. When the brake unit is applied, the detection signal emitted from the proximity sensor may be directed towards the groove on the piston tube. When the brake unit is not applied, the detection signal emitted from the proximity sensor may be directed towards a portion of the piston tube that does not include the groove.

Further details and advantages will be understood from the following detailed description read in conjunction with the accompanying drawings.

BRIEF DESCRIPTION OF THE DRAWINGS

FIG. 8 is a side view of a piston tube in accordance with another embodiment of the present disclosure.

DESCRIPTION OF THE DISCLOSURE

For purposes of the description hereinafter, spatial orientation terms, as used, shall relate to the referenced embodiment as it is oriented in the accompanying drawings, figures, or otherwise described in the following detailed description. However, it is to be understood that the embodiments described hereinafter may assume many alternative variations and configurations. It is also to be understood that the specific components, devices, features, and operational sequences illustrated in the accompanying drawings, figures, or otherwise described herein are simply exemplary and should not be considered as limiting.

The present disclosure is directed to, in general, a piston stroke sensor arrangement for a brake unit and, in particular, to a piston stroke sensor arrangement for a disc brake unit including a proximity sensor. Certain preferred and non-limiting embodiments of the components of the piston stroke sensor arrangement are illustrated in FIGS. 1-8.

Figure 1:
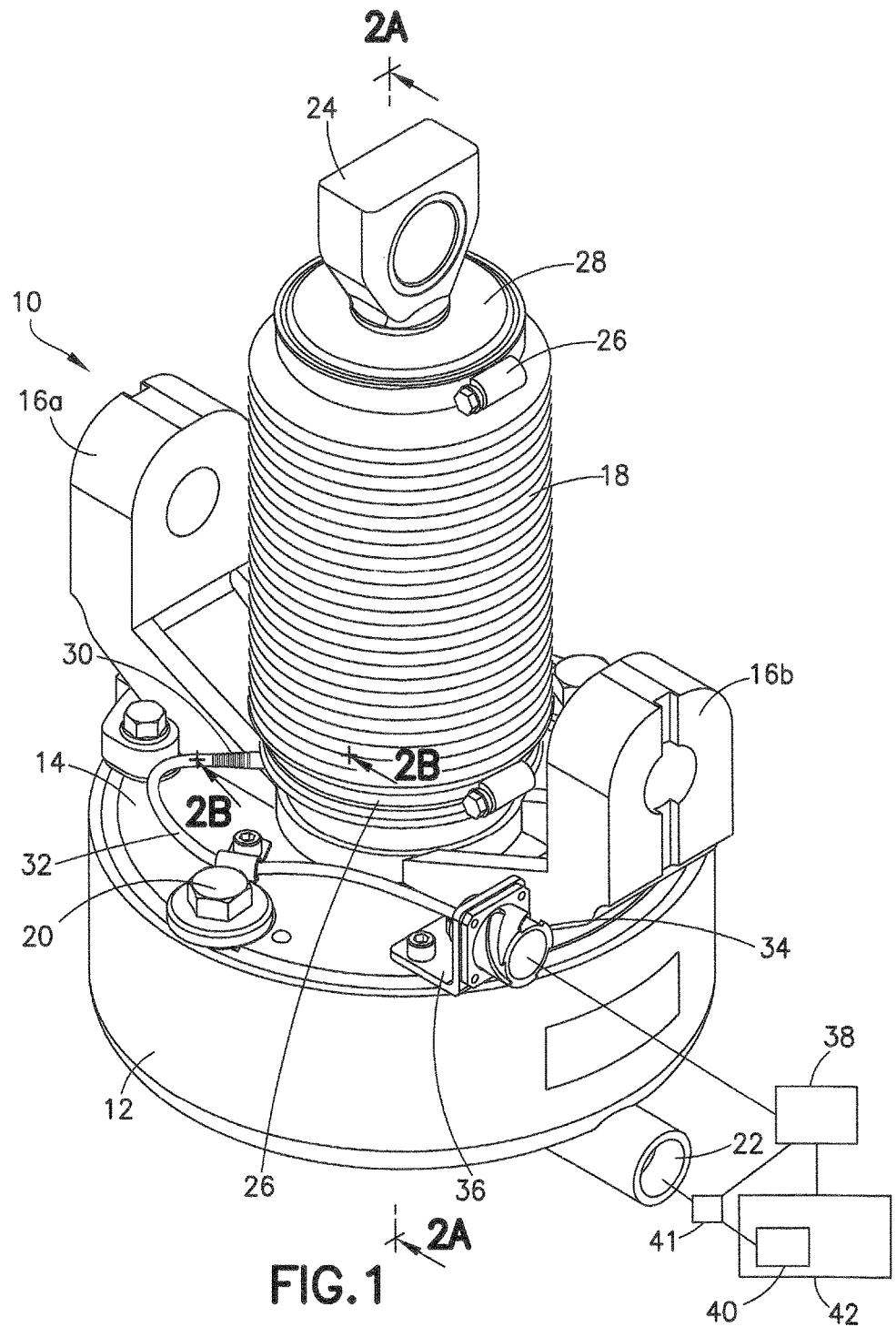
FIG. 1 is a front perspective view of a piston stroke sensor arrangement for a brake unit in accordance with one embodiment of the present disclosure.
Figure 2A:
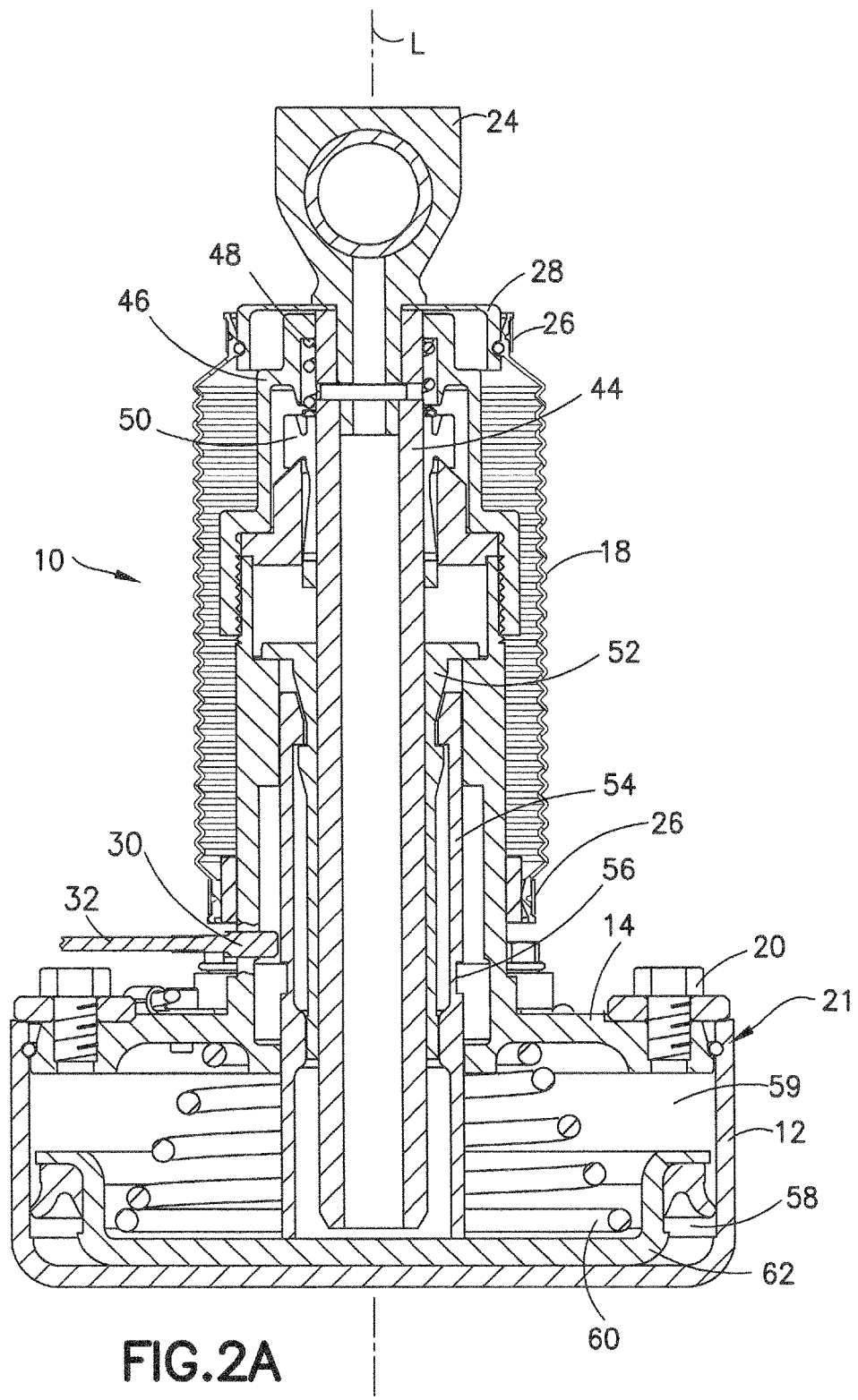
FIG. 2A is a cross-sectional view of the brake unit of FIG. 1 along line 2A-2A.
Figure 2B:
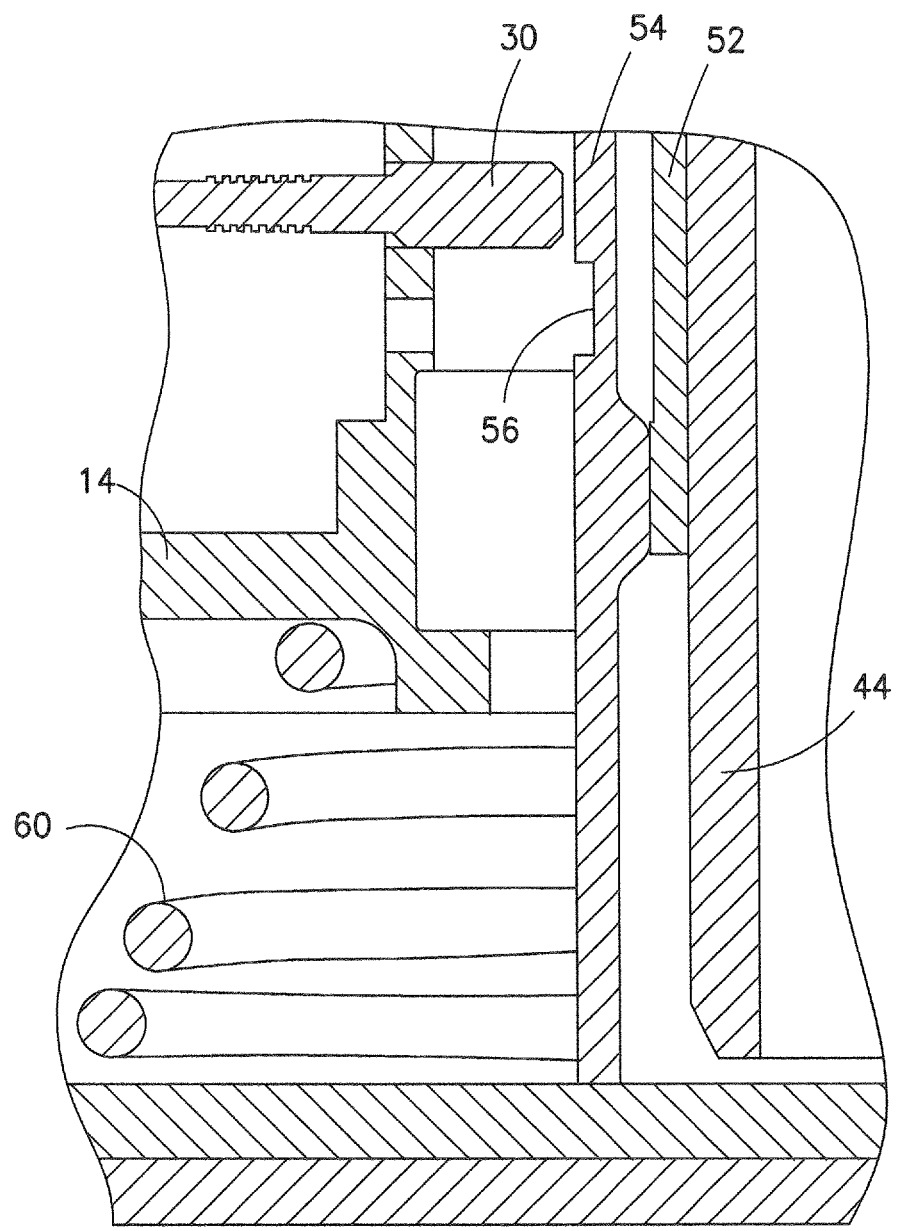
FIG. 2B is a cross-sectional view of the brake unit of FIG. 1 along line 2B-2B.

With reference to FIGS. 1-2B, a brake unit 10 is shown. In one embodiment, the brake unit 10 may be a part of a disc brake unit commonly used on railway vehicles. It is to be understood, however, that alternative types of brake units may be used, including disc brake units used in conjunction with bicycles, cars, buses, and other types of vehicles that use brake discs for effecting a braking force to a wheel. The brake unit 10 includes a cylinder 12, an anchor flange 14, first and second extension members 16a, 16b, and bellows 18. The cylinder 12 and anchor flange 14 are secured to one another using a retaining ring 21 and a plurality of fasteners 20. As shown in FIG. 2A, the retaining ring 21 is positioned between the cylinder 12 and anchor flange 14 and the fasteners 20 lock the cylinder 12 and anchor flange 14 in a secure connection. An inlet 22 extends outwardly from the cylinder 12 and is configured to supply pressurized fluid from a fluid source 40 on a railway vehicle 42 to the brake unit 10. An air pressure indicator 41 may be positioned in fluid communication between the fluid source 40 and the inlet 22 to measure the air pressure being supplied to the brake unit 10. In one embodiment, the air pressure indicator 41 may be a pressure transducer. The extension members 16a, 16b are configured for connection to a caliper assembly (not shown) of a disc brake unit (not shown).

A proximity sensor 30 may be inserted through an opening defined in the anchor flange 14. The proximity sensor 30 may be used to detect the presence of nearby objects and, in particular, metallic objects without any physical contact with the objects. The proximity sensor 30 emits a detection signal S and identifies changes in the return signal. Depending on the value of the return signal and the air pressure being supplied to the brake unit 10, a notification device 38 determines the position of the target object. Many different types of proximity sensors may be used with the brake unit 10, including a capacitive displacement sensor, an optical sensor, an eddy-current sensor, an inductive sensor, a laser sensor, a magnetic sensor, a radar sensor, a sonar sensor, or an ultrasonic sensor, among others. In one preferred embodiment, an inductive proximity sensor is used. The proximity sensor 30 may be cylindrical in shape and is held in the anchor flange 14. It is also to be understood that the proximity sensor 30 may have a trapezoidal, triangular, rectangular, or oval cross-sectional shape. The proximity sensor 30 may be threaded into the anchor flange 14 with a lock nut (not shown) used to secure the proximity sensor 30 in place. The proximity sensor 30 may also be installed using a friction fit, but it is also contemplated that the proximity sensor 30 may be installed using fasteners and a flange or an adhesive. A cable 32 connects the proximity sensor 30 to a connector 34. The connector 34 is secured to the anchor flange 14 by a flange 36. The proximity sensor 30 sends the positional output information to the notification device 38 via the connector 34. The air pressure indicator 41 may also be in communication with the notification device 38 to send air pressure information to the notification device 38. The notification device 38 may be an indicator panel provided directly on the brake unit 10, a remote handheld unit held by an operator of the railway vehicle, a control panel of the railway vehicle, or a control panel and/or a central processing unit (CPU) provided in a railway monitoring station. It is to be understood that the connector 34 may send the signal information through a wired connection or remotely. The connector 34 may be connected to a remote signal emitting device (not shown) or hard-wired into a control panel and/or CPU.

As shown in FIGS. 2A and 2B, the brake unit 10 houses a piston assembly configured to apply a braking force to the brake disc of a railway vehicle. As discussed hereinabove, a spindle head 24 may be connected to a caliper assembly that applies a braking force to the brake disc of the railway vehicle. The spindle head 24 may be threadedly secured to the spindle 44 that is housed within the brake unit 10. The spindle 44 is movable along a longitudinal axis L of the brake unit 10. The bellows 18 may extend from the anchor flange 14 to a spindle cover 28. The bellows 18 are secured to the brake unit 10 with clamp rings 26. It is to be understood that the bellows 18 may be secured using other methods, such as adhesives, fasteners, cable ties, or welding. The spindle cover 28 may be provided on one end of the spindle 44 near the spindle head 24. As shown in FIG. 2A, the spindle cover 28 may be retained between the spindle head 24 and a spindle 44.

A collet support 46 is also provided in the brake unit 10. One end of the collet support 46 encircles the spindle 44 and an opposing end of the collet support 46 is connected to an end of the anchor flange 24. The collet support 46 and the anchor flange 14 include correspondingly threaded ends that are connected to one another. A biasing member 48 is positioned in one end of the collet support 46. A first collet 50 is also positioned in the collet support 46 and is positioned around the spindle 44. As the biasing member 48 is compressed by the first collet 50, the biasing member 48 creates a biasing force against the first collet 50.

A second collet 52 is positioned around a lower portion of the spindle 44 and is provided inside of a piston tube 54 of the brake unit 10. In one aspect, the lower portion of the spindle 44 may extend from a first end of the piston tube 54 to an opposing second end of the piston tube 54. The piston tube 54 effects the movement of the second collet 52 during operation of the brake unit 10. The proximity sensor 30 is positioned in the anchor flange 14 adjacent the piston tube 54.

A groove 56 is defined in the outer surface of the piston tube 54. The groove 56 may be a cut or depression formed in the piston tube 54. The groove 56 may extend around the entire outer circumferential surface of the piston tube 54. The groove 56 may be defined on the piston tube 54 adjacent the position of the proximity sensor 30 provided in the anchor flange 14. The groove 56 may be defined around the outer surface of the piston tube 54 because the piston tube 54 may rotate during operation of the brake unit 10. Regardless of the angular orientation of the piston tube 54 relative to the proximity sensor 30, the proximity sensor 30 is capable of taking a positional reading of the piston tube 54. It is also to be understood that instead of using the groove 56, a protrusion 57 may extend from the outer circumferential surface of the piston tube 54 (see FIG. 8). The protrusion 57 may be squared to ensure an accurate reading from the proximity sensor 30. Additional details regarding the groove 56 are provided hereinbelow.

Although the groove 56 is used with the piston tube 54, it is also contemplated that a hole may be provided in the piston tube 54 instead. Unlike the piston tube 54 of the brake unit 10, which may experience rotational movement during operation of the brake unit 10, some piston tubes may move in only a linear direction without rotational movement. Since the piston tube may not rotate during this operation, it is unnecessary to provide a groove around the entire outer circumferential surface of the piston tube. Therefore, a hole or plurality of holes may be drilled into a portion of the linear piston tube adjacent the proximity sensor.

The cylinder 12 of the brake unit 10 defines a first cavity 58 and a second cavity 59 therein and houses a biasing member 60 and a piston 62. The biasing member 60 may be provided in the second cavity 59. The piston tube 54 and the piston 62 may be welded together. During operation of the brake unit 10, pressurized fluid is provided to the first cavity 58 via inlet 22. The pressurized fluid acts against one side of the piston 62, thereby compressing the biasing member 60. As the biasing member 60 is compressed, a biasing force is created against the piston 62. As the piston 62 is moved further into the brake unit 10, the piston 62 and the piston tube 54 move upward along the longitudinal axis L of the brake unit 10. The piston tube 54 moves towards and contacts the second collet 52. As the piston tube 54 moves upward, the second collet 52 begins to grip the spindle 44 to move the spindle 44 upward in the brake unit 10. The spindle 44 is moved along the longitudinal axis L of the brake unit 10, thereby moving the spindle head 24 further out of the brake unit 10. As the spindle head 24 is moved further out of the brake unit 10, a pivoting force is applied to the caliper assembly (not shown), which applies pressure to the brake discs of the railway vehicle via the brake pads. During this movement, the piston tube 54 moves within the anchor flange 14 along the longitudinal axis L of the brake unit 10 relative to the proximity sensor 30.

Figure 3:
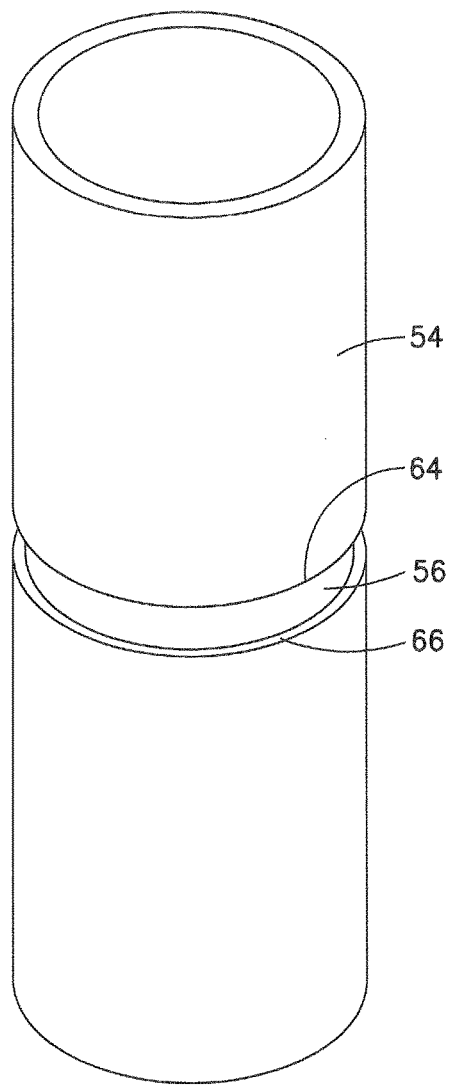
FIG. 3 is a front perspective view of a piston tube in accordance with one embodiment of the present disclosure.
Figure 4:
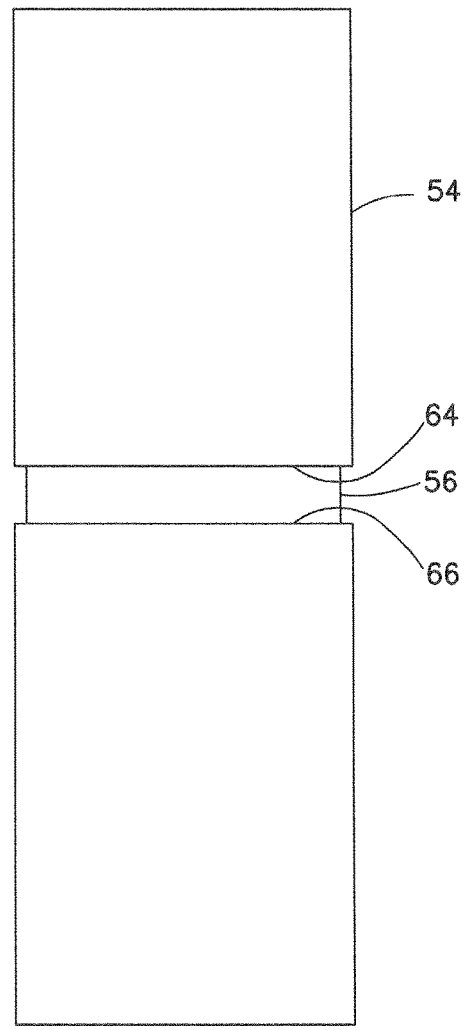
FIG. 4 is a side view of the piston tube of FIG. 3.

With reference to FIGS. 3 and 4, a more detailed description of the groove 56 of the piston tube 54 is provided. As shown, the groove 56 is defined in the piston tube 54 and extends around the outer circumferential surface of the piston tube 54. The groove 56 may be provided on the entire outer circumferential surface of the piston tube 54 or only a portion of the outer circumferential surface of the piston tube 54. A leading edge 64 of the groove 56 and a trailing edge 66 of the groove 56 are provided on the piston tube 54. The leading edge 64 of the groove 56 is positioned closer to the spindle head 24, and the trailing edge 66 of the groove 56 is positioned closer to the cylinder 12 (see FIG. 2A).

Figure 5:
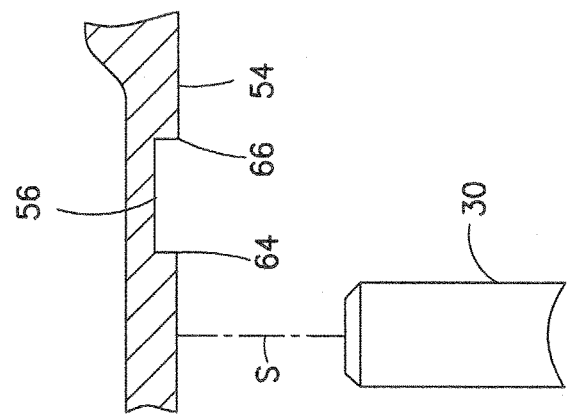
FIG. 5 is a sectional view depicting a proximity sensor and piston tube in a non-applied position in accordance with the present disclosure.

With reference to FIGS. 2a, 2b, and 5-7, a description of a method of determining the position of a piston in a brake unit is provided. Upon activation of the proximity sensor 30, a detection signal S is emitted from the proximity sensor 30. As described above, the detection signal S may be any type of feedback signal, including sonar, radar, laser, magnetic, or any other electronic signal. In one embodiment, the proximity sensor 30 is an inductive proximity sensor 30 that is configured to detect the presence of metallic objects, such as the piston tube 54, via the use of a magnetic field. The proximity sensor 30 emits a detection signal S configured to determine the location of the piston 62 and piston tube 54 within the brake unit 10 based on the position of the piston tube 54 relative to the detection signal S emitted from the proximity sensor 30 and the amount of air pressure provided to the brake unit 10. As shown in FIGS. 1, 2A, and 5, when the piston tube 54 is positioned at a non-applied position, the detection signal S contacts the outer circumferential surface of the piston tube 54. In one embodiment, the detection signal S detects metal on the piston tube 54. Based on the detection of metal, the detection signal S relays positional output information back to the notification device 38 that the proximity sensor 30 is detecting the presence of a metallic object. The air pressure indicator 41 will also send air pressure information to the notification device 38. In a non-applied position of the brake unit 10, the proximity sensor 30 will detect a metallic object and the air pressure indicator 41 will indicate no air pressure being supplied to the brake unit 10. The notification device 38 may then activate an indicator light or alert signal that the brake unit 10 is not applied.

Figure 6:
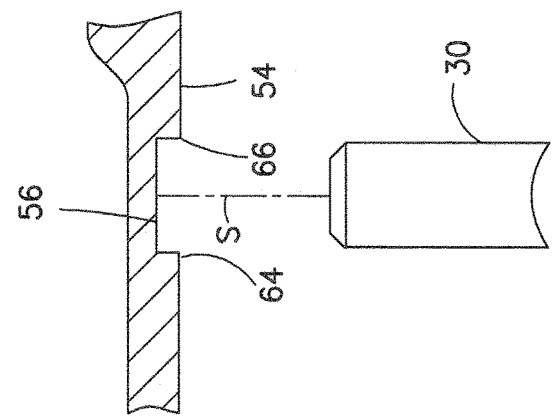
FIG. 6 is a sectional view of the proximity sensor and piston tube of FIG. 5 in an applied position.

As the brake unit 10 is applied, the piston 62 and piston tube 54 are moved along the longitudinal axis L of the brake unit 10. As shown in FIGS. 1, 2A, and 6, when the brake unit 10 is applied, the leading edge 64 of the groove 56 is moved past the detection signal S and the groove 56 will align with the detection signal S emitted from the proximity sensor 30. The detection signal S detects the absence of metal in the groove 56 and provides this positional output information to the notification device 38. The air pressure indicator 41 will also send air pressure information to the notification device 38 indicating that air pressure is being provided to the brake unit 10. Due to the absence of metal and the supply of air pressure to the brake unit 10, the notification device 38 identifies that the brake unit 10 is in an applied position. As will be understood by one of skill in the art, the groove 56 may be cut to the appropriate depth and width so when the piston tube 54 is in the non-applied position, the proximity sensor 30 detects metal on the piston tube 54 and, when the piston tube 54 is in the applied position, the proximity sensor 30 detects the absence of metal on the piston tube 54. It is to be understood that the proximity sensor 30 may not be configured to detect metal. Instead, the proximity sensor 30 may be configured to detect a solid object, such as the piston tube 54, and the absence of a solid object, such as the groove 56.

Figure 7:
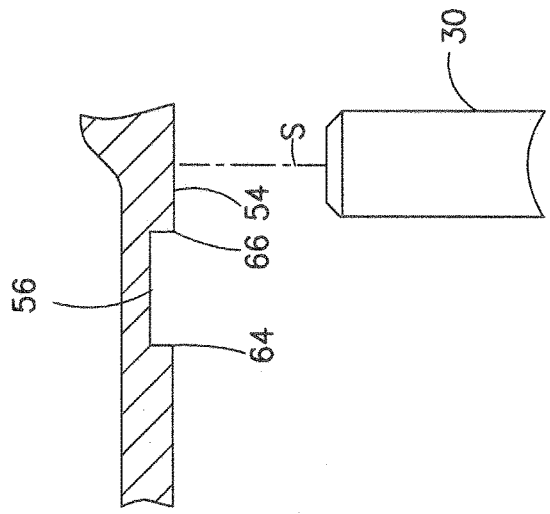
FIG. 7 is a sectional view of the proximity sensor and piston tube of FIG. 5 in an over-stroke position.

As shown in FIGS. 1, 2A, and 7, when the brake unit 10 is over-stroked, the leading edge 64 and trailing edge 66 of the groove 56 are moved past the detection signal S towards the spindle head 24. During operation, the brake unit 10 may become over-stroked due to a loss of brake pads (not shown) or an internal failure in the brake unit 10. This situation can cause the piston tube 54 to be pushed past the desired position into an over-stroke position. It is beneficial to the operator of the vehicle to be aware of this situation so repairs and maintenance may be made to the appropriate structure of the brake unit 10. As the trailing edge 66 moves past the detection signal S, the proximity sensor 30 will again detect the metal of the piston tube 54 and will send this positional output information back to the notification device 38. The air pressure indicator 41 will send air pressure information to the notification device 38 indicating that air pressure is being supplied to the brake unit 10. Based on the proximity sensor 30 detecting a metallic object and the air pressure indicator 41 indicating that air pressure is being applied, the notification device 38 may identify that the brake unit 10 is in an over-stroked position.

As will be readily apparent to one of skill in the art, the position of the piston tube 54 in the brake unit 10 may be determined by providing the protrusion 57 on the piston tube 54. This method is similar to that used with the groove 56 on the piston tube 54. When the brake unit 10 is applied, the detection signal S emitted from the proximity sensor 30 may be directed towards the protrusion 57 on the piston tube 54. When the brake unit 10 is not applied, the detection signal S emitted from the proximity sensor 30 may not be directed towards the protrusion 57 on the piston tube 54. The detection signal S may be directed towards another portion of the piston tube 54.

By using this piston stroke sensor arrangement on the brake unit, it is no longer necessary to inspect the brake units from underneath of or below the railway vehicle. The brake unit may be tested remotely or directly from the outside of the railway vehicle without the need for a pit or maintenance facility to inspect an in-board brake unit. This arrangement also assists in identifying an over-stroke condition for the brake unit 10 so that corrective action may be taken swiftly and promptly.

While an embodiment of a piston stroke sensor arrangement for a brake unit is shown in the accompanying figures and described hereinabove in detail, other embodiments will be apparent to, and readily made by, those skilled in the art without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A piston stroke sensor arrangement for a brake unit, comprising:
   the brake unit comprising a piston, a piston tube, a spindle provided within the piston tube, and a collet provided on the spindle, the spindle extending within the piston tube from a first end of the piston tube to an opposing second end of the piston tube; and
   a proximity sensor supported on the brake unit,
   wherein the proximity sensor determines the location of the piston within the brake unit based on the position of the piston tube relative to the proximity sensor,
   wherein a groove is defined in an outer circumferential surface of the piston tube, and
   wherein, when the brake unit is in an applied position, the proximity sensor is directed towards the groove on the piston tube and does not detect metal of the piston tube,
   wherein, when the brake unit is in a non-applied position, the proximity sensor is directed towards a portion of the piston tube that does not include the groove and detects the metal of the piston tube, and
   wherein the piston tube is in direct contact with the piston so that, as the piston is moved within the brake unit, the piston tube and the spindle are also moved within the brake unit.

2. The piston stroke sensor arrangement as claimed in claim 1, the proximity sensor further comprising an inductive proximity sensor.

3. The piston stroke sensor arrangement as claimed in claim 1, wherein a protrusion is provided on an outer circumferential surface of the piston tube, and
   wherein, when the brake unit is applied, the proximity sensor is directed towards the protrusion on the piston tube, and
   wherein, when the brake unit is not applied, the proximity sensor is not directed towards the protrusion on the piston tube.

4. The piston stroke sensor arrangement as claimed in claim 1, further comprising an air pressure indicator in fluid communication between a fluid source and the brake unit, and
   a notification device connected to the proximity sensor and the air pressure indicator,
   wherein the air pressure indicator is configured to send information to the notification device identifying the amount of air pressure being supplied to the brake unit, and
   wherein information from the proximity sensor is directed to the notification device to identify a position of the piston in the brake unit.

5. The piston stroke sensor arrangement as claimed in claim 1, the brake unit further comprising a disc brake unit.

6. The piston stroke sensor arrangement as claimed in claim 1, wherein the proximity sensor is configured to detect when the piston of the brake unit is positioned in an over-stroke position.

7. The piston stroke sensor arrangement as claimed in claim 1, the brake unit further comprising an anchor flange that supports the piston and the piston tube,
   wherein the proximity sensor is positioned in the anchor flange adjacent the piston tube.

8. A railway vehicle with a piston stroke sensor arrangement, comprising:
   the railway vehicle comprising a brake unit, the brake unit comprising a piston, a piston tube, a spindle provided within the piston tube, and a collet provided on the spindle the spindle extending within the piston tube from a first end of the piston tube to an opposing second end of the piston tube; and
   a proximity sensor positioned on the brake unit,
   wherein the proximity sensor determines the location of the piston within the brake unit based on the position of the piston tube relative to the proximity sensor,
   wherein a groove is defined in an outer circumferential surface of the piston tube, and
   wherein, when the brake unit is applied, the proximity sensor is directed towards the groove on the piston tube and does not detect metal on the piston tube,
   wherein, when the brake unit is not applied, the proximity sensor is directed towards a portion of the piston tube that does not include the groove and detects the metal on the piston tube, and wherein the piston tube is in direct contact with the piston so that, as the piston is moved within the brake unit, the piston tube and the spindle are also moved within the brake unit.

9. The railway vehicle as claimed in claim 8, the proximity sensor further comprising an inductive proximity sensor.

10. The railway vehicle as claimed in claim 8, wherein a protrusion is provided on an outer circumferential surface of the piston tube, and
　　wherein, when the brake unit is applied, the proximity sensor is directed towards the protrusion on the piston tube, and
　　wherein, when the brake unit is not applied, the proximity sensor is not directed towards the protrusion on the piston tube.

11. The railway vehicle as claimed in claim 8, further comprising an air pressure indicator positioned in fluid communication between a fluid source and the brake unit, and
　　a notification device connected to the proximity sensor and the air pressure indicator,
　　wherein the air pressure indicator is configured to send information to the notification device identifying the amount of air pressure being supplied to the brake unit, and
　　wherein information from the proximity sensor is directed to the notification device to identify a position of the piston in the brake unit.

12. The railway vehicle as claimed in claim 8, the brake unit further comprising a disc brake unit.

13. The railway vehicle as claimed in claim 8, wherein the proximity sensor is configured to detect when the piston of the brake unit is positioned in an over-stroke position.

14. The railway vehicle as claimed in claim 8, the brake unit further comprising an anchor flange that supports the piston and piston tube,
　　wherein the proximity sensor is positioned in the anchor flange adjacent the piston tube.

15. A method of determining a piston stroke position for a brake unit, comprising the steps of:
　　a) providing the brake unit comprising:
　　　　a piston, a piston tube, a spindle provided within the piston tube, and a collet provided on the spindle, the spindle extending within the piston tube from a first end of the piston tube to an opposing second end of the piston tube; and
　　　　a proximity sensor positioned on the brake unit;
　　b) emitting a detection signal from the proximity sensor to the piston tube; and
　　c) determining the position of the piston within the brake unit based on the position of the piston tube relative to the detection signal emitted from the proximity sensor,
　　wherein a groove is defined in an outer circumferential surface of the piston tube,
　　wherein, when the brake unit is applied, the detection signal emitted from the proximity sensor is directed towards the groove on the piston tube and does not detect metal on the piston tube,
　　wherein, when the brake unit is not applied, the detection signal emitted from the proximity sensor is directed towards a portion of the piston tube that does not include the groove and detects the metal on the piston tube, and
　　wherein the piston tube is in direct contact with the piston so that, as the piston is moved within the brake unit, the piston tube and the spindle are also moved within the brake unit.

\* \* \* \* \*